(12) United States Patent
Chaudhry

(10) Patent No.: US 6,188,557 B1
(45) Date of Patent: Feb. 13, 2001

(54) SURGE SUPPRESSOR

(75) Inventor: Nisar A. Chaudhry, Huntington Station, NY (US)

(73) Assignee: TII Industries, Inc., Copiague, NY (US)

(*) Notice: Under 35 U.S.C. 154(b), the term of this patent shall be extended for 0 days.

(21) Appl. No.: 09/197,820

(22) Filed: Nov. 23, 1998

(51) Int. Cl.⁷ ........................................ H02H 3/00
(52) U.S. Cl. .................. 361/111; 361/56; 361/118; 361/120; 361/127
(58) Field of Search .................. 361/56, 58, 111, 361/113, 118, 120, 124, 127

(56) References Cited

U.S. PATENT DOCUMENTS

| | | | |
|---|---|---|---|
| 4,438,477 | 3/1984 | Cawley | 361/119 |
| 4,616,155 | 10/1986 | Guichard | 313/573 |
| 4,677,518 | 6/1987 | Hershfield | 361/56 |
| 4,807,083 | 2/1989 | Austin | 361/111 |
| 4,912,589 | * 3/1990 | Stolarczyk | 361/56 |
| 4,979,209 | 12/1990 | Collin et al. | 379/399 |
| 5,394,466 | 2/1995 | Schneider et al. | 379/399 |
| 5,412,526 | 5/1995 | Kapp | 361/56 |
| 5,566,056 | 10/1996 | Chaudhry | 361/117 |
| 5,625,521 | 4/1997 | Luu | 361/111 |
| 5,675,468 | 10/1997 | Chang | 361/119 |

FOREIGN PATENT DOCUMENTS

| | | | | |
|---|---|---|---|---|
| 38 31 935 | 3/1990 | (DE) | | H01T/4/08 |
| 0 165 347 | 12/1985 | (EP) | | H02H/9/06 |
| 0 286 739 | 10/1988 | (EP) | | H02H/9/04 |
| 0 353 166 | 1/1990 | (EP) | | H02H/9/02 |
| 0 840 413 | 5/1998 | (EP) | | H01T/4/08 |
| WO 90/03058 | 3/1990 | (WO) | | H02H/9/06 |
| WO 91/16752 | 10/1991 | (WO) | | H02H/9/04 |

OTHER PUBLICATIONS

Gapped Arresters Revisited: A Solution to Cascade Coordination, Mansoor et al, IEEE, Preprint (1997).

Trinkwald J: "Schaumende Ausloser" Elektrische Energie Technik, vol. 35, No. 1, Feb. 1990, pp. 32 and 34. Figures 1 and 2 disclose overvoltage protection circuits using MOVs.

* cited by examiner

*Primary Examiner*—Stephen W. Jackson
(74) *Attorney, Agent, or Firm*—Morgan & Finnegan, L.L.P.

(57) ABSTRACT

Surge suppressor apparatus comprising AC power line overvoltage protection, telephone voice line overvoltage and overcurrent protection, high speed data line overvoltage and overcurrent protection and coaxial transmission line overvoltage protection, all tied to a common ground.

14 Claims, 9 Drawing Sheets

SURGE SUPPRESSOR

BACKGROUND OF THE INVENTION

1. Field of the Invention

The present invention relates to apparatus for protecting devices connected to AC power lines, telephone lines and/or coaxial transmission lines and, more particularly, to surge suppressors which protect those devices using a common ground.

2. Discussion of the Related Art

Today many homes use sensitive electronic devices as telecommuting and conducting business from one's home have become more commonplace. In addition to home entertainment centers with expensive audio/visual equipment, many homes now have personal computers, modems, printers, copiers, facsimile machines, telephone answering systems and home security systems. These sensitive electronic devices are connected to the outside world by means of telephone lines (both voice lines and high speed data lines), coaxial transmission lines (both cable TV and satellite dish antennas) and AC power lines.

Standards have been developed for residential cabling known as the EIA/TIA 570 standard and the Consumer Electronics Bus (CEBus®). These standards deal with Category 3 and Category 5 unshielded twisted pair cabling and coaxial cabling. These standards are described in "Cabling The Workplace '96" at pages 769 through 800.

Companies have recently begun offering complete home wiring systems which comply with the CEBus® standard. One example is the HomeStar® Wiring System offered by Lucent Technologies. According to Lucent Technologies literature, the HomeStar® System "[i]ntegrates a wide range of telecommunications and home automation technologies—from interactive home entertainment and personal communications to security and environmental management systems." The HomeStar® System does not, however, provide overvoltage protection for the different types of wires (RG6 coaxial cabling, Category 3 and Category 5 unshielded twisted pair cabling) used in the system.

Lightning is a major source of overvoltage conditions on residential wiring. The overvoltage condition can result from a direct lightning strike or it can be induced in the AC transmission lines by a nearby lightning strike. It is estimated that there are over 90 million lightning bolts striking the United States annually. Of course, only a small percentage strike buildings. However, each year thousands of homes and businesses are damaged or destroyed by lightning strikes. In 1990 residential claims for lightning damage exceeded one billion dollars. This number will increase as homeowners purchase more sophisticated electronics equipment.

Overvoltage conditions can also result from power line crosses caused, for example, by a vehicle striking a utility pole. Transients (voltage spikes) are caused by the utility company when it switches capacitor banks on and off line in order to correct the power factor (VI cosθ). Transients can also originate within the home when inductive loads such as electric motors are switched. Transients can also result from switching non-inductive loads and can be induced on wiring in the home.

Overvoltage conditions can also result from the loss of the AC neutral. If that occurs, devices that are normally connected to 110 to 120 volts AC are subjected to 220 to 240 volts AC. The loss of the AC neutral can result from corrosion of the meter pan at the service entrance where the meter is located outside the building and is exposed to the elements. Most plug-in secondary surge suppressors being sold today are not designed to withstand the loss of the AC neutral and may create a fire hazard when the AC neutral is lost.

Primary overvoltage protection for telephone lines is provided by surge arresters located in network interface devices mounted on the outside of the home. See devices 73 in FIG. 3 of U.S. Pat. No. 4,979,209 issued to Collins et al on Dec. 19, 1990. Grounding for these overvoltage protection devices is provided by means of an earth ground brought into the enclosure at the time of installation and attached to ground bus 71 at terminal 71A.

Coaxial transmission lines carrying cable television signals may be brought into a home through network interface devices mounted on the outside of the home. See U.S. Pat. No. 3,394,466 issued to Schneider et al on Feb. 28, 1995. As shown in FIG. 1 of that patent, the coaxial cable is grounded by connecting a ground strap 228 from module 220 to ground bus 71 which is then connected to earth ground. See column 4, lines 50–54. Coaxial surge arresters for protecting coaxial transmission lines from overvoltage conditions are also known. See U.S. Pat. No. 4,616,155 issued to Guichard on Oct. 7, 1986 and U.S. Pat. No. 5,566,056 issued to Chaudhry on Oct. 15, 1996.

Many homeowners attempt to protect their valuable electronic equipment with plug-in surge suppressors. Such devices do not protect equipment from the large amplitude pulses caused by lightning strikes, although they do offer some protection against low energy transients originating within the home. Moreover, plug-in surge suppressors are generally located far from the earth ground where the electric utilities are brought into the building. A surge suppressor is only as good as the ground to which it is connected. A plug-in surge suppressor which protects both AC power lines and telephone lines is shown in U.S. Pat. No. 4,438,477 issued to Cawley on Mar. 20, 1984.

Plug-in surge suppressors sold prior to 1998 had to meet the requirements of Underwriters Laboratories Standard 1449, First Edition ("UL 1449 Ed 1") dated Aug. 28, 1985. On Aug. 15, 1996 UL 1449 Second Edition ("UL 1449 Ed 2") was released and became effective Feb. 16, 1998. It requires new tests that were not required by UL 1449 Ed 1. For example, a new test that must be passed to qualify under UL 1449 Ed 2 is that a plug-in surge suppressor must not create a fire hazard in the event the AC neutral is lost. Since UL 1449 Ed 2 was promulgated in August 1996, companies have been struggling to comply with the new test requirements.

In addition to the need for plug-in surge suppressors that will meet UL 1449 Ed 2, there is also a need for surge suppressors that will meet UL 1449 Ed 2 and that can be installed in electronic devices such as TVs and VCRs at the time of manufacture to protect those devices from overvoltage conditions appearing on AC power lines and coaxial transmission lines.

SUMMARY OF THE INVENTION

The present invention provides plug-in surge suppressors which are more effective in protecting electronic equipment and human beings from the dangers associated with overvoltage conditions, particularly those caused by lightning and the loss of the AC neutral, and which meet the more stringent requirements of UL 1449 Ed 2.

The present invention also provides surge suppressors which will meet the requirements of UL 1449 Ed 2 and which may be incorporated into electronic devices such as TVs and VCRs at the time of manufacture to protect those devices from overvoltage conditions appearing on AC power lines and coaxial transmission lines.

The present invention, whether in the form of a plug-in surge suppressor or a surge suppressor incorporated in an electronic device at the time of manufacture, significantly reduces the likelihood that a fire will result from an overvoltage condition or a component failure in the surge suppressor.

The subject matter which I regard as my invention is more particularly pointed out in the claims at the end of the specification. The invention, including its method of operation and its numerous advantages, may best be understood by reference to the following description taken in connection with the accompanying drawings wherein like reference numerals refer to like components.

DESCRIPTION OF THE PREFERRED EMBODIMENTS

Figure 1:
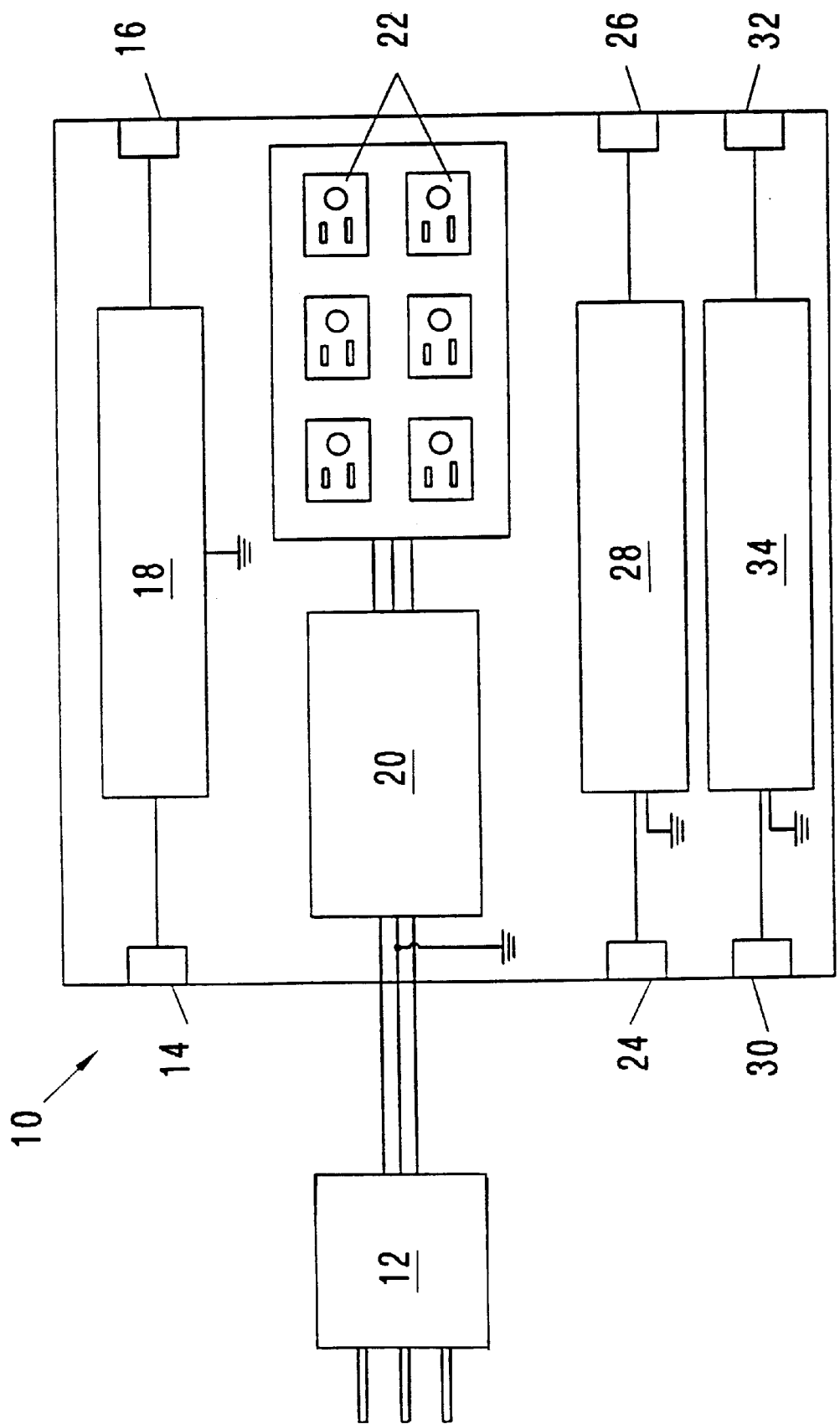
FIG. 1 is a schematic block diagram of a plug-in surge suppressor in accordance with the present invention.

FIG. 1 is a schematic block diagram of plug-in surge suppressor 10 according to the present invention. Surge suppressor 10 comprises a three-prong male AC plug 12 which is adapted to plug into an AC outlet. It has three conductors: AC line, AC neutral and ground. Surge suppressor 10 has RJ-11 jacks 14 and 16 to which a telephone voice line or FAX line may be connected. Between jacks 14 and 16 is an overvoltage and overcurrent protection circuit 18 which may take the form of either of the circuits shown in FIGS. 3 and 4 which are described later. Surge suppressor 10 also has RJ-45 jacks 30 and 32 to which a high speed data line may be connected. Between jacks 30 and 32 are overvoltage and overcurrent protection circuits which may take the form of the circuits shown in FIGS. 2A and 2B which are described later. Surge suppressor 10 also has F-type coaxial connectors 24 and 26 to which a coaxial transmission line may be connected. Between connectors 24 and 26 is a coaxial surge arrestor which may take the form of the device shown in FIG. 5 which is described later. Surge suppressor 10 also contains an AC overvoltage protection circuit 20 and multiple female AC outlets 22. Overvoltage protection circuit 20 may take the form of the circuits shown in FIGS. 6, 7 and 8 which are described later.

Figure 3:
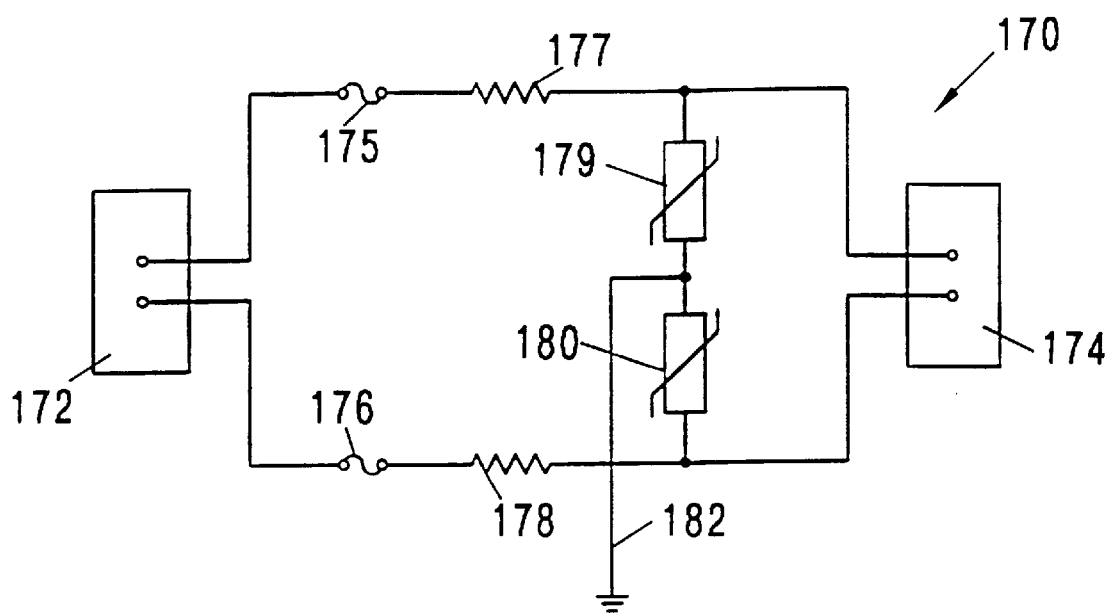
FIG. 3 is a schematic diagram of a telephone voice line overvoltage/overcurrent protection circuit for use with the present invention.

FIG. 3 is a schematic diagram of an overvoltage and overcurrent protection circuit 170 for a telephone voice line. Circuit 170 is connected between RJ-11 jacks 172 and 174. Circuit comprises fuses 175 and 176, which may be 250 volt, 350 milliampere fuses made by Littelfuse and sold under part number 220-003. These fuses protect against overcurrent conditions. Circuit 170 also includes resistors 177 and 178 which may be 10 ohm, 5 watt resistors. These resistors limit the current which flows through the circuit in the event of an overvoltage condition. Circuit 170 also includes MOVs 179 and 180 which may be obtained from Harris Semiconductor Corp. under part number V180ZA10. The MOVs start clamping at around 200 volts and the maximum clamping voltage is about 300 volts. Conductor 182 is connected to ground and grounds MOVs 179 and 180.

Figure 4:
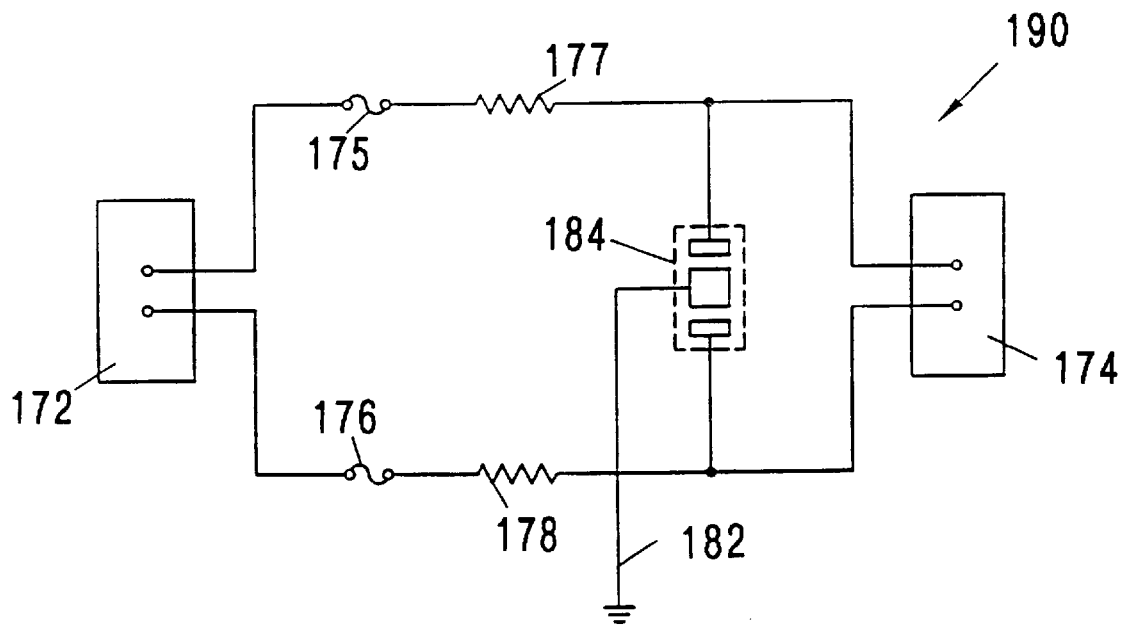
FIG. 4 is a schematic diagram of an alternative telephone voice line overvoltage/overcurrent protection circuit for use with the present invention.

FIG. 4 is a schematic diagram of an alternative overvoltage and overcurrent protection circuit 190 for a telephone voice line. The only difference between circuit 170 and circuit 190 is that circuit 170 used a pair of MOVs 179, 180 whereas circuit 190 uses a three-electrode gas tube 184. In this application a three-electrode gas tube is equivalent to a pair of MOVs connected back-to-back. Instead of a three-electrode gas tube a pair of two-electrode gas tubes connected back-to-back could also be used and would be equivalent to a three electrode gas tube in this application. A suitable three-electrode gas tube is a TII 11 gas tube made by TII Industries, Inc., Copiague, N.Y.

Figure 5:
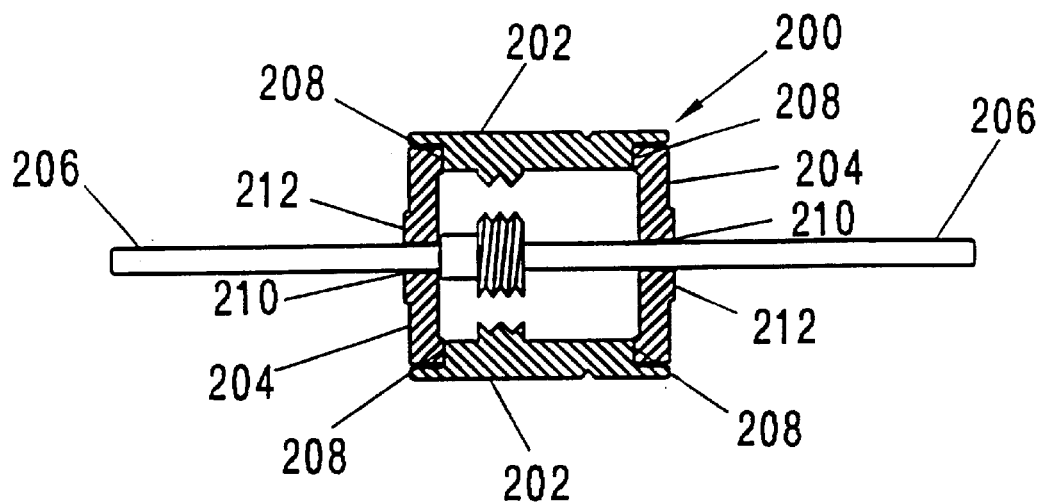
FIG. 5 is a cross-sectional view of a coaxial surge arrestor for use with the present invention.

FIG. 5 is a reproduction of FIG. 14 from U.S. Pat. No. 5,566,056 entitled "Coaxial Transmission Line Surge Arrestor" which issued to Nisar Chaudhry on Oct. 15, 1996. FIG. 5 illustrates a coaxial surge arrestor which may be used between connectors 42 and 26. As explained at column 6, line 54 through column 7, line 51 of U.S. Pat. No. 5,566,056, a portion of the interior surface of conductive housing 202 and a portion of the exterior surface of center conductor 206 are roughened, for example by threads or other forms of serration, to concentrate the electric field and increase the reliability of the gas discharge tube operation. In addition, as with conventional gas discharge tubes, those surfaces are preferably coated with a low work function material to reduce the breakdown voltage and enhance the firing characteristics of the gas discharge tube. The gas discharge occurs in the region between the two surfaces, which is the active discharge region.

As also shown in FIG. 5, the distance between the inner surface of the conductive housing 202 and the outer surface of the center conductor 206 varies along the length of the center conductor. Put another way, the ratio of the inside diameter D of housing 202 to the outside diameter d of center conductor 206 varies along the length of the center conductor. The ratio D/d may vary by a factor of 2 or 3 or more along the length of center conductor 206. This variation in the ratio D/d is used to adjust the impedance of the gas discharge tube and for matching the impedance of the surge arrestor in which the gas discharge tube is located to that of the coaxial transmission line to which the surge arrestor is attached.

The impedance of a coaxial transmission line is proportional to the logarithm of (D/K)/d, where "D" is the inside diameter of the outer conductor, "d" is the outside diameter of the inner conductor and "K" is the dielectric constant of the medium between the inner and outer conductors. In the case of the gas discharge tube shown in FIG. 5, the medium is an inert gas which has a dielectric constant of approximately one. Therefore, the impedance of the gas discharge tube varies between the insulating ends as the logarithm of the ratio D/d. The insulating ends 204 are preferably ceramic and ceramic has a dielectric constant of about eight. By varying the ratio D/d along the length of center conductor 206 one can compensate for changes in impedance caused by, inter alia, the dielectric constants of the insulating ends 204. The portion of gas discharge tube 200 that is used for impedance matching is designated by the letter "I", to distinguish it from the active discharge region "G". See FIG. 14 of U.S. Pat. No. 5,566,056.

In addition to adjusting the ratio D/d within the gas discharge tube, it is also possible to adjust the length of the active gas discharge region "G" relative to the length of the impedance matching region "I" to match the impedance of the gas discharge tube to that of the coaxial transmission line. Thus, for a 50 ohm coaxial transmission line the ratio of the region "G" to the region "I" may be on the order of one to one whereas, for a 75 ohm coaxial transmission line, the ratio of the region "G" to the region "I" may be on the order of one to two.

Figure 2:
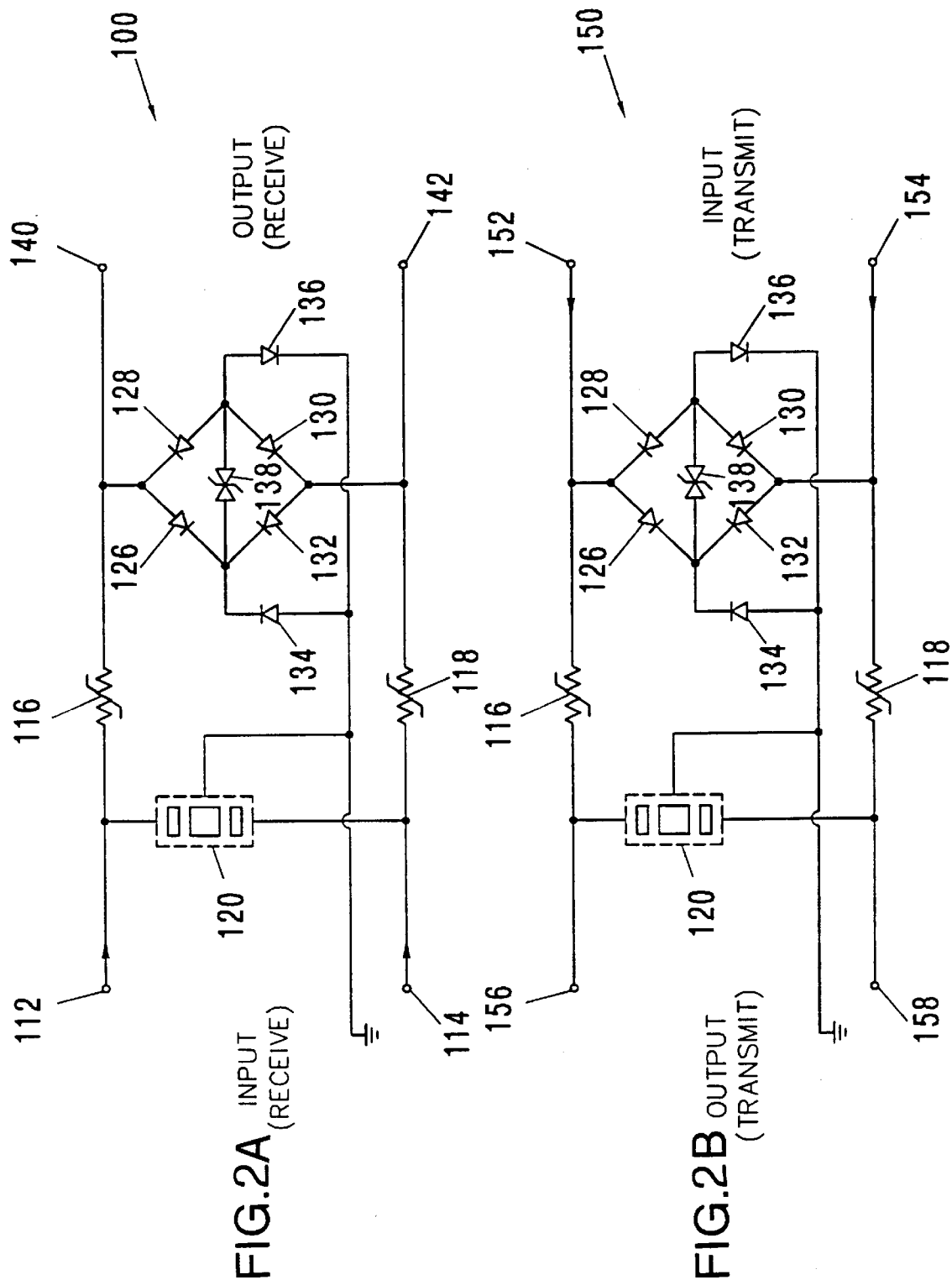
FIG. 2A is a schematic diagram of a high speed data line overvoltage/overcurrent protection circuit for use with the present invention.
FIG. 2B is a schematic diagram of another high speed data line overvoltage/overcurrent protection circuit for use with the present invention.

FIGS. 2A and 2B of this application correspond to FIGS. 2A and 2B of U.S. Pat. No. 5,790,363 entitled "Ethernet Overvoltage/Overcurrent Protection System" which issued to Nisar Chaudhry on Aug. 4, 1998.

FIG. 2A is a schematic diagram of an overvoltage and overcurrent protection circuit 100 which is adapted to be connected in series with an unshielded twisted pair of wires carrying incoming digital signals in an Ethernet network or "X" DSL, which includes various forms of Digital Subscriber Line technology. Circuit 100 has an input (receive) side and an output (receive) side. The input side is adapted to be connected to a source of digital signals at terminals 112 and 114. The source may, for example, be the output from an optical network unit (ONU), a concentrator, a computer, a local area network (LAN) or a wide area network (WAN). The output side of circuit 100 is adapted to be connected to a destination of digital signals at terminals 140 and 142. The destination may, for example, be a computer or a LAN and one or more servers and one or more personal computers (PCs) may be connected to the LAN.

Circuit 100 provides both primary and secondary overvoltage protection as well as overcurrent protection. The overcurrent protection is provided by positive temperature coefficient resistors (PTCRs) 116 and 118 which are connected in series with the unshielded twisted pair of wires carrying the incoming digital signals. PTCRs may be type TR600-150 which are available from Raychem Corp., Menlo Park, Calif. The primary overvoltage protection section comprises a three-electrode gas discharge tube 120 which is connected across the twisted pair of wires which carry the incoming digital signals. Gas discharge tube 120 conducts when the voltage on either of the twisted wires exceeds a threshold value. The breakdown voltage may be between about 150 and about 300 volts, with a breakdown voltage of on the order of 250 volts being preferred. A suitable three-electrode gas discharge tube is shown in Napiorkowski, U.S. Pat. No. 4,212,047. Suitable three-electrode gas discharge tubes are also available from TII Industries, Inc., Copiague, N.Y. as TII 71 type or 73/75 type with a voltage breakdown range of 150–300 VDC.

As will be understood by persons skilled in the art, two two-electrode gas discharge tubes may be used in lieu of a single three electrode gas discharge tube and using two two-electrode gas discharge tubes is the full equivalent of using one three-electrode gas discharge tube in this application. In the present invention three-electrode gas tubes are preferred to two-electrode gas tubes and, therefore, three-electrode gas tubes are shown in FIGS. 2A and 2B.

Figure 12B:
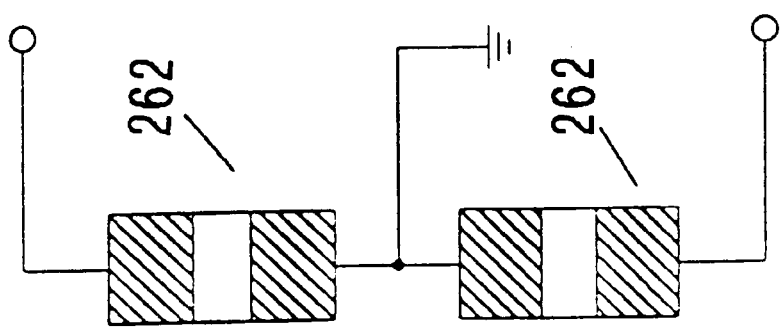
FIGS. 12A and 12B illustrate the equivalence between a single three electrode gas discharge tube and a pair of two electrode gas discharge tubes connected back-to-back.
Figure 12A:
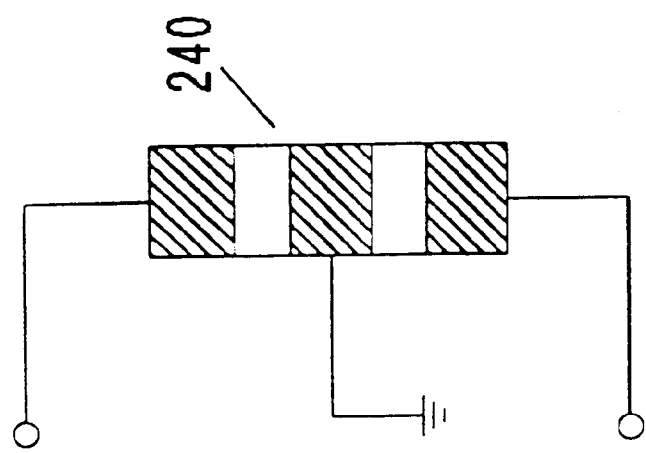

FIG. 12A shows a single three electrode gas discharge tube 240 while FIG. 12B shows a pair of two electrode gas discharge tubes 262 connected back-to-back. FIGS. 12A and 12B illustrate the equivalence between a single three electrode gas tube and a pair of two electrode gas tubes connected back-to-back. As used herein, the expression "three electrode gas tube structure" is defined to mean both a single three electrode gas tube as shown in FIG. 12A and a pair of two electrode gas tubes connected back-to-back as shown in FIG. 12B.

The secondary overvoltage protection section of circuit 100 comprises diodes 126 through 136 and avalanche diode 138. Diodes 126 through 132 form a diode bridge and avalanche diode 138 is connected across the diode bridge. The diode bridge is connected across the twisted pair of wires carrying the incoming digital signals and limits the voltage on those wires in the event that the voltage substantially exceeds, for example, the normal digital signal levels. Typical digital signal levels are plus or minus five volts. Diodes 126 through 132 may be type IN4007, 1 amp, 1000 volt PIV diodes. Diodes 134 and 136 may be type RL204G, 2 amp, 1000 volt PIV diodes. Diode 138 may be a type 1.5KE12, 12 volt avalanche diode. Alternatively, diode 138 may be two series-connected low capacitance, 6 volt 1500 watt diodes made by Samtech of 650 Mitchell Road, Newbury Park, Calif. 91320 and sold under part number LC01-6.

Using two avalanche diodes connected in series provides two benefits: (1) the surge energy handling capability of the protector doubles and (2) the capacitance offered to the diode bridge is halved. Two avalanche diodes connected in parallel could also double the surge handling capability, but diodes do not have the same breakdown voltage, and therefore do not share energy equally. Moreover, using two avalanche diodes connected in parallel causes the capacitance to the diode bridge to double, which could significantly attenuate the digital signal.

Excessive positive voltages appearing at terminal 140 are clamped by diodes 126 and 136 and avalanche diode 138. Excessive negative voltages appearing at terminal 140 are clamped by diodes 128 and 134 and avalanche diode 138. Excessive positive voltages appearing on terminal 142 are clamped by diodes 132 and 136 and avalanche diode 138. Excessive negative voltages appearing at terminal 142 are clamped by diodes 130 and 134 and avalanche diode 138. If diode 138 is a 12 volt avalanche diode, then voltages exceeding about plus or minus 15 volts would be clamped by the secondary protection circuit. If diode 138 is two series-connected 12 volt avalanche diodes, then voltages exceeding about 35 volts would be clamped by the secondary protection circuit. Avalanche diodes are available with many different breakdown voltages and the clamping voltage may be chosen by selecting suitable avalanche diodes.

FIG. 2B is a schematic diagram of an overvoltage and overcurrent protection circuit 150 which is the same as circuit 300 and operates the same way. Terminals 152 and 154 are connected to the unshielded twisted pair of wires carrying high speed digital signals from the destination back to the source, while terminals 156 and 158 are connected to the unshielded twisted pair of wires that are connected to the source.

Figure 6:
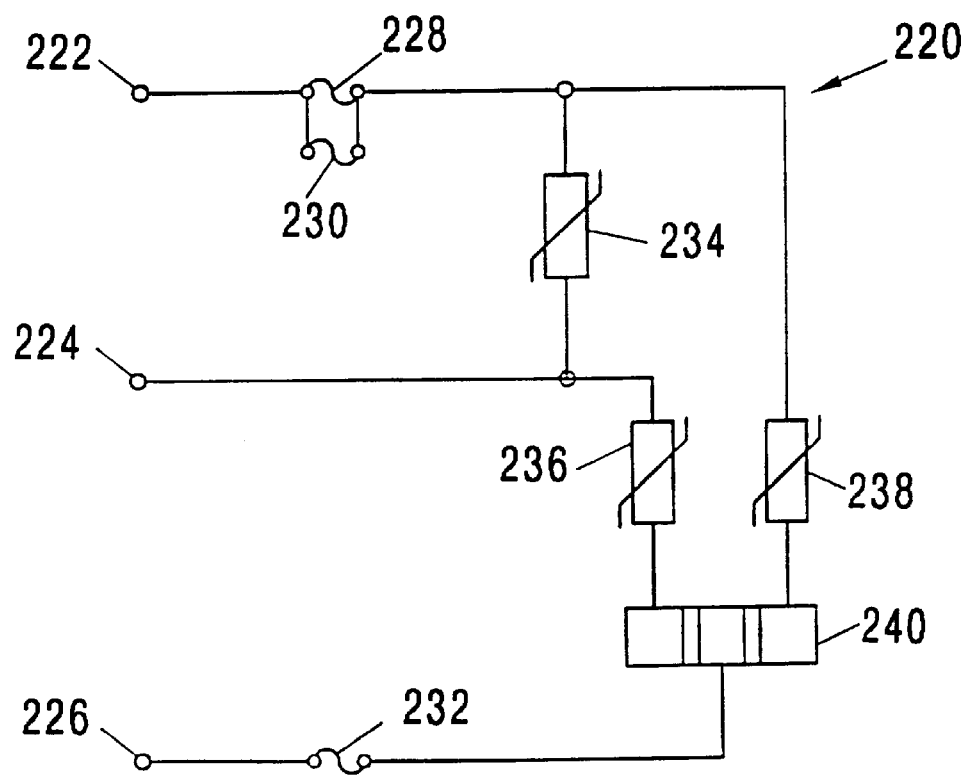
FIG. 6 is a schematic diagram of an AC protection circuit for use with the present invention.

The AC overvoltage protection circuits are described in greater detail in FIGS. 6 through 9. FIG. 6 discloses an AC overvoltage protection circuit 220 which employs thermal fuses 228, 230 connected in series with the AC line and thermal fuse 232 connected in series with the ground. Suitable thermal fuses are available as Microtemp Thermal Cutoffs made by Thermodisc, Incorporated, 1320 South Main Street, Mansfield, Ohio, 44907-0538 under part number RVLU 84C. These fuses will fuse open when excessive heat is generated within the module housing the AC protection circuit. MOV 234 is connected between AC line and AC neutral and may be a 40 KA, 8/20 microsecond device which is available from Siemens Components, Inc., 186 Wood Avenue South, Iselin, N.J. 08830, under part number LS40K150QP. MOVs 236 and 238 are connected, respectively, between the AC neutral and one electrode of gas tube 240 and between the AC line and the other electrode to the gas tube 240. MOVs 236 and 238 are available from Harris Semiconductor Corporation under part number V130LA20B. Gas tube 240 may be an TII 11B gas tube which is available from TII Industries, Inc., Copiague, N.Y. and has a breakdown voltage in the range of 300 to 500 volts. Fuses 228, 230 and 232 are located in close physical proximity to the MOVs and the gas tube.

The AC protection circuit shown in FIG. 6 has been tested and meets the requirements of UL 1449 Ed 2. The MOVs between the AC line and the gas tube and the AC neutral and the gas tube ensure that the gas tube will turn off after a voltage surge has caused the gas tube to turn on. Also, the fact that the gas tube is in series with the MOVs connected to the AC neutral and the AC line ensures that there will be only a very small leakage current through the MOVs in the absence of a voltage surge sufficient to cause the gas tube to conduct. Although a three electrode gas tube is shown in FIG. 6, a pair of two electrode gas tubes connected back-to-back could be used and are equivalent to a three electrode gas tube in this application. See FIGS. 12A and 12B.

Figure 7:
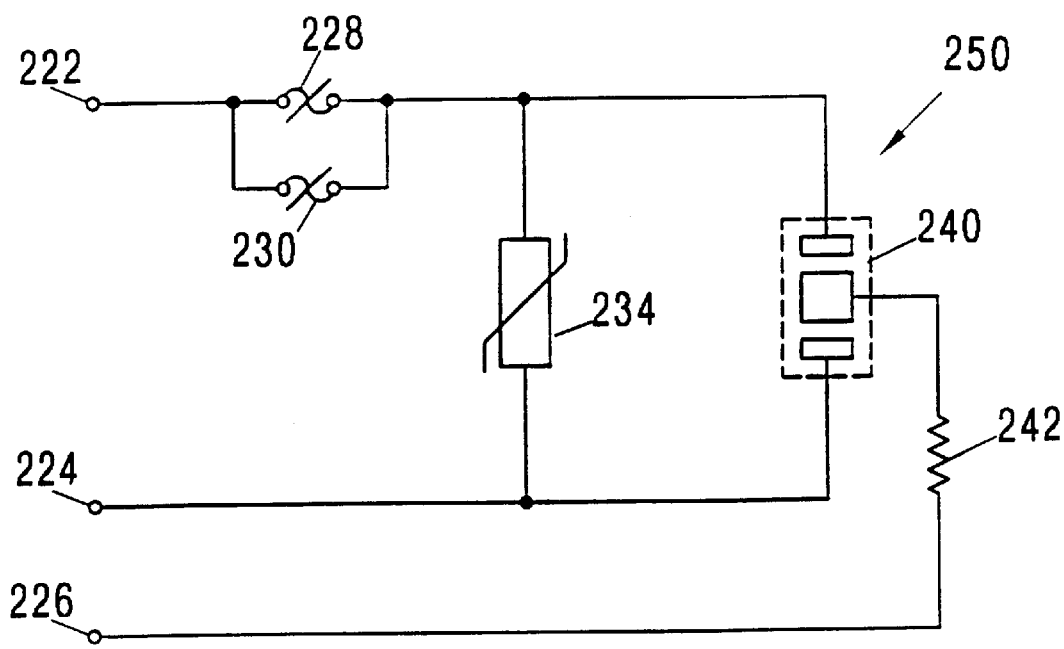
FIG. 7 is a schematic diagram of an alternative AC protection circuit for use with the present invention.

FIG. 7 is a schematic diagram of an alternative AC overvoltage protection circuit 250 according to the present invention. Circuit 250 is connected to the AC line at 222, to the AC neutral at 224 and to the common ground in the surge suppressor at 226. Circuit 250 comprises temperature sensitive fuses 228 and 230, MOV 234 and three-electrode gas tube 240. A resistor 242 is connected in series between gas tube 240 and ground to ensure that the gas tube will come out of conduction once the overvoltage condition no longer exists. A suitable MOV 234 is available from Harris Semiconductor Corp. under part number V131H40. It has a breakdown voltage of about 200 volts and has a maximum clamping voltage of about 350 volts. Fuses 228 and 230 are located in close physical proximity to MOV 234 and gas tube 240. In the event of an overvoltage condition, MOV 234 will clamp the AC line to a lower voltage. Should MOV 234 fail in an open circuit condition then, in the event of an overvoltage condition, gas tube 240 will protect the equipment plugged into outlets 22 by clamping the line to a very low voltage, thereby causing fuses 228 and 230 to open. Although a three-electrode gas tube is shown in FIG. 7, a pair of two-electrode gas tubes connected back-to-back could be used and are equivalent to a three electrode gas tube for this application. See FIGS. 12A and 12B.

Figure 8:
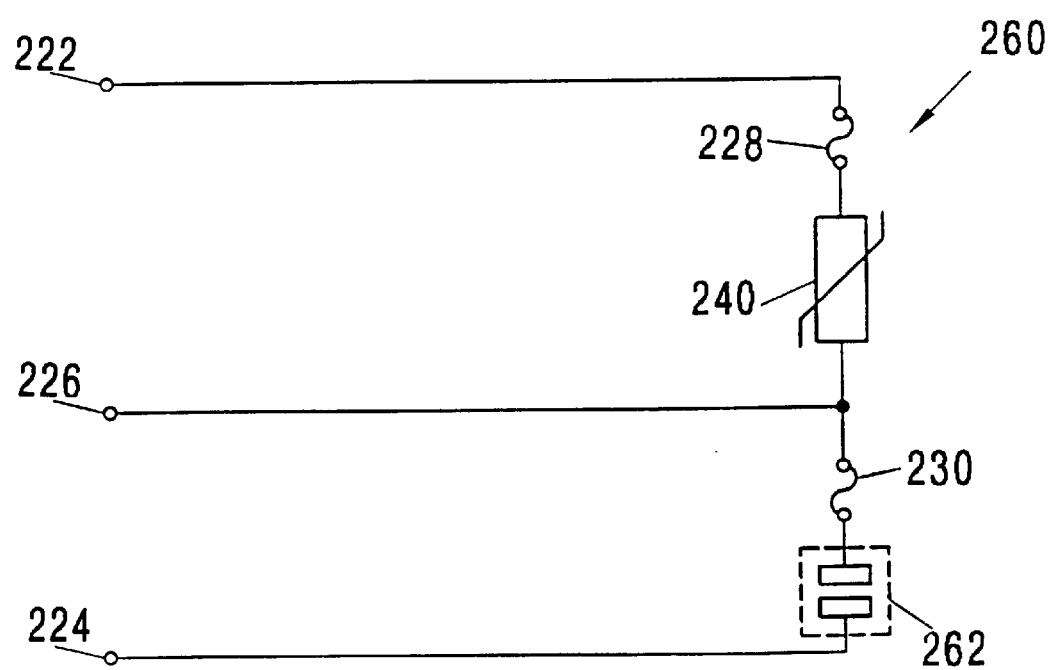
FIG. 8 is a schematic diagram of an another alternative AC protection circuit for use with the present invention.

FIG. 8 is a schematic diagram showing another alternative AC overvoltage protection circuit 260. In FIG. 8 the AC power line is connected at 222, the AC neutral at 226 and the ground at 224. Circuit 260 has a temperature sensing fuse 228 connected in series with MOV 240 and a temperature sensing fuse 230 connected in series with a two-electrode gas tube 262. In lieu of a two-electrode gas tube a three-electrode gas tube could be used, with two of the electrodes connected together and would be equivalent to a two-electrode gas tube in this application. In FIG. 8 fuse 228 is located in close physical proximity to MOV 240 and fuse 230 is located in close physical proximity to gas discharge tube 262. Fuses 228 and 230 in FIG. 8 are the same as fuses 228 and 230 in FIG. 7 while gas discharge tube 262 may be a TII 44 tube made by TII Industries, Inc., Copiague, N.Y. and having a breakdown voltage between about 300 and about 500 volts.

Figure 9:
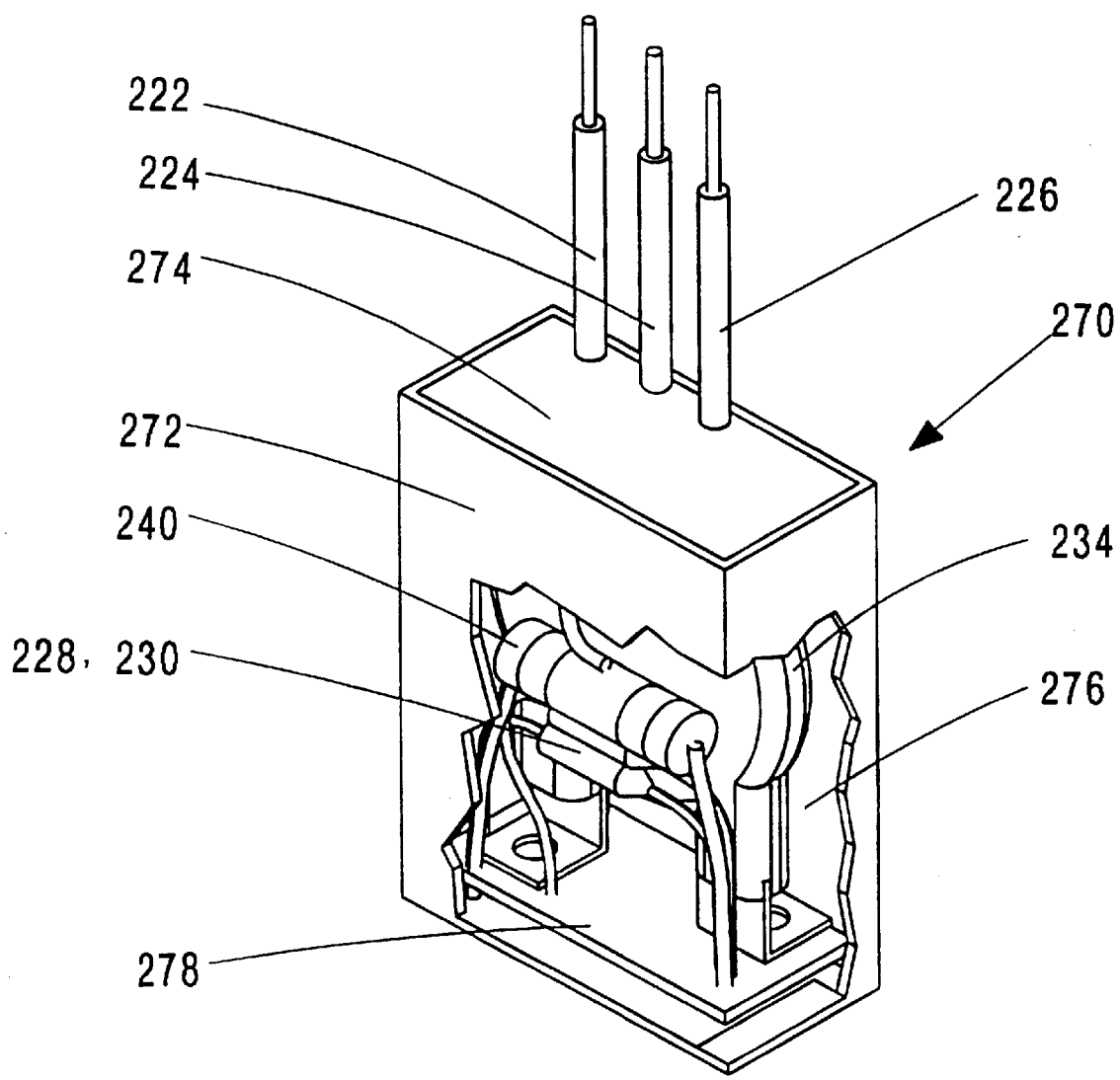
FIG. 9 is a perspective drawing, partially cut away, of an AC protection module which could contain the AC protection circuits shown in FIGS. 6, 7 and 8.

FIG. 9 is a perspective drawing, partially cut away, showing how the AC overvoltage protection circuits shown schematically in FIGS. 6, 7 and 8 can be configured in a module suitable for incorporation into a plug-in secondary surge suppressor. FIG. 9 shows a module 270 containing the AC protection circuit of FIG. 7 and having conductors 222, 224 and 226 which are adapted to be connected, respectively, to the AC line, ground and the AC neutral. Located within enclosure 272 are MOV 234, three electrode gas discharge tube 240 and temperature sensing fuses 228, 230. The enclosure is preferably filled with electrical grade silica sand 276. The enclosure is sealed with epoxy 274. Components are mounted on a printed circuit board 278.

Figure 10:
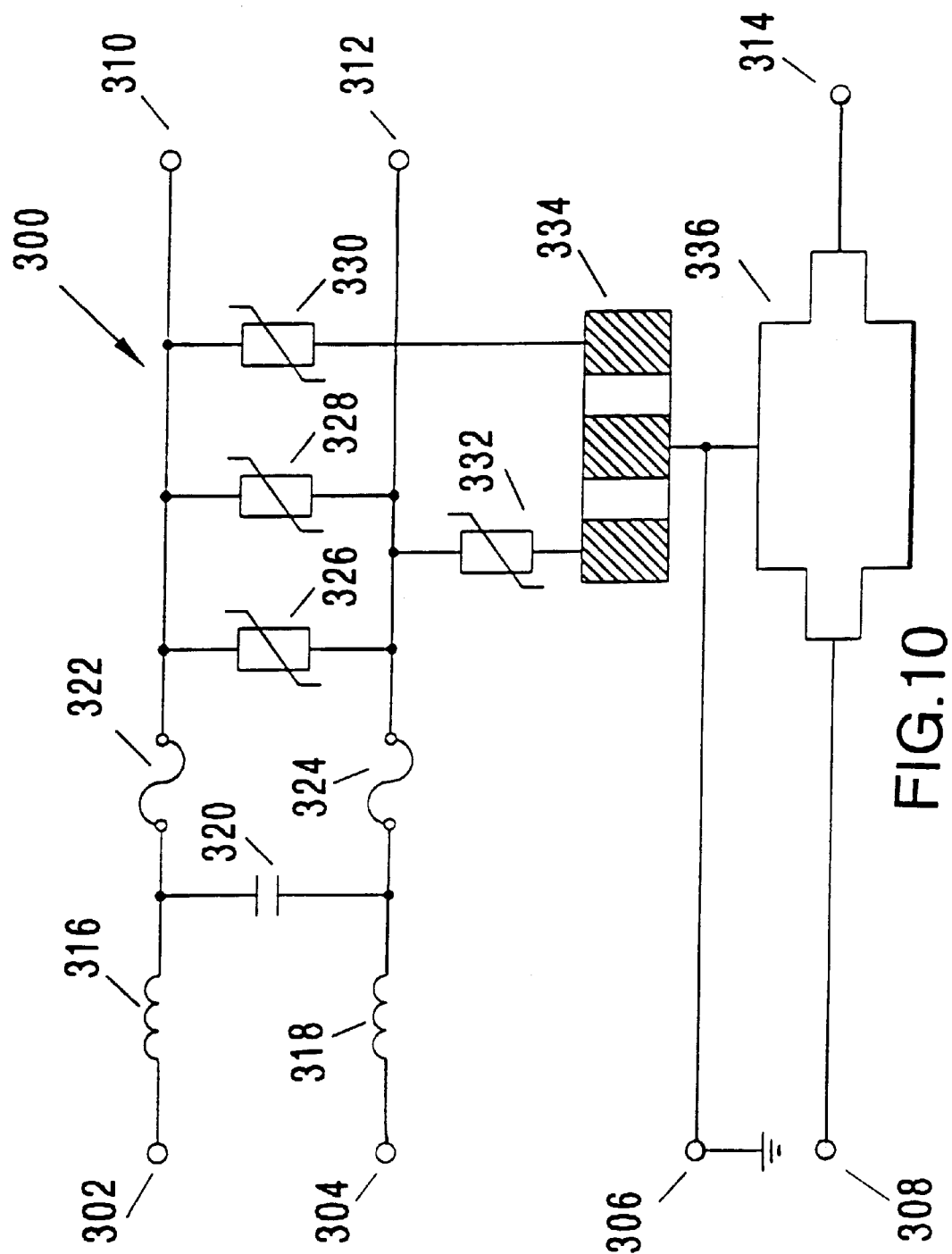
FIG. 10 is a schematic diagram of a surge suppressor which is suitable for incorporation in an electronic device at the time of manufacture.

FIG. 10 is a schematic diagram of a surge suppressor 300 which is suitable for incorporation into an electronic device such as a TV or VCR at the time of manufacture. The various components could be mounted on a printed circuit board which could be encased in epoxy to avoid a fire hazard in the event of a component failure. The construction of the resulting surge suppressor would then resemble the construction shown in FIG. 9.

Surge suppressor 300 is adapted to be connected to AC power lines at 302 and 304, to ground at 306 and to a coaxial transmission line at 308. The AC power output from the surge suppressor appears at 310 and 312, while the coaxial transmission line output appears at 314. Inductors 316 and 318 and capacitor 320 form a electromagnetic interference (EMI) filter which filters out EMI which may be present on the AC power lines and prevents EMI generated by the electronic device from feeding back onto the AC power lines. Inductors 316 and 318 may be 47 microhenries while capacitor 320 may be 0.01 microfarads. Connected in series with inductors 316 and 318 are thermal sensing fuses 322 and 324 which may be G5A Series Thermal Cutoffs made by Thermodisc. A matched pair of MOVs 326 and 328 is connected in parallel across the AC power lines and may have a clamping voltage of 250 volts. MOVs 330 and 332 are connected, respectively, from the AC power lines to the first and second electrodes of three electrode gas tube 334, the third electrode being connected to ground. MOVs 332 and 334 preferably have a lower clamping voltage than MOVs 326 and 328. If the clamping voltage of MOVs 326 and 328 is 250 volts, then the clamping voltage of MOVs 330 and 332 may be 230 volts. MOVs 326 and 328 may be part number V250LA40B, while MOVs 330 and 332 may be part number V230LA40A, and both are available from Harris Semiconductor Corp., Melbourne, Fla.

A suitable gas tube 334 is available from TII Industries, Inc., Copiague, N.Y. as part number TII 11A which has a breakdown voltage between 150 and 300 volts DC. Instead of using a three electrode gas tube, one could use a pair of two electrode gas tubes connected back-to-back and to the ground. See FIGS. 12A and 12B. Also connected to ground is coaxial transmission line surge arrestor 336 which may take the form of the device shown in FIG. 5 which has already been described.

Thermal sensing fuses 322 and 324 are located in close physical proximity to MOVs 326 through 332 and gas tube 334. If any of the MOVs or the gas tube shorts and overheats, the fuses will cut off power to the electronic device connected to the surge suppressor. Gas tube 334, which connected in series with MOVs 330 and 332, has an inter-electrode capacitance of on the order of 10 picofarads. The capacitive reactance at 60 Hz is greater than 250 megohms and, therefore, little current leaks through MOVs 330 and 332.

Figure 11:
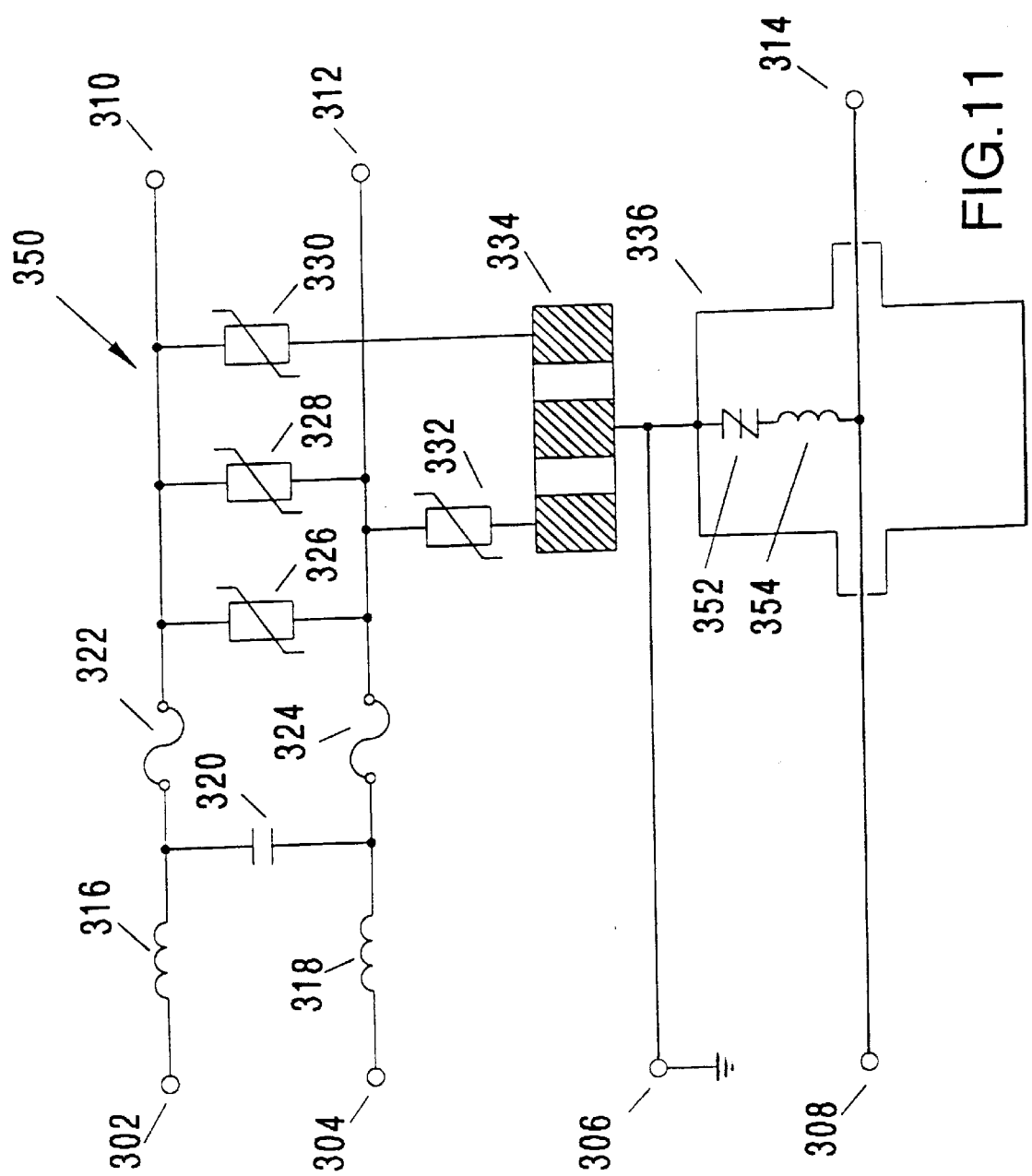
FIG. 11 is a schematic diagram of an alternative surge suppressor which is suitable for incorporation in an electronic device at the time of manufacture.

FIG. 11 is a schematic diagram of an alternative surge suppressor 350 which is suitable for incorporation into an electronic device such as a TV or VCR at the time of manufacture. The only difference between FIG. 10 and FIG. 11 is found in coaxial transmission line surge arrestor 336. In FIG. 11 overvoltage protection for the coaxial transmission line is provided by the series combination of avalanche diode 352 and inductor 354 connected between the hollow outer conductive housing and the inner axial conductor. Avalanche diode 352 may be a 1.5KE, 6.8 volt avalanche diode available from SGS Thomson, Lincoln, Mass., while inductor 354 may be 6.8 microhenries. In lieu of an avalanche diode a thyristor could also be employed. As with FIG. 10, gas tube 334 could be a pair of two electrode gas tubes connected back-to-back and to the ground instead of a three electrode gas tube. See FIGS. 12A and 12B.

While the present invention has been described by reference to various preferred embodiments, it will be understood by persons skilled in the art that many modifications and variations may be made in those preferred embodiments without departing from the spirit and scope of the present invention. Accordingly, it is intended that the invention not be limited to the disclosed preferred embodiments, but that it have the full scope permitted by the following claims.

What is claimed is:

1. AC overvoltage protection apparatus adapted to be connected to an AC power line, an AC neutral and a ground for protecting against overvoltage conditions appearing on the AC power line without the use of a trigger device, the apparatus comprising:

(a) at least one MOV directly connected between the AC power line and the AC neutral, the MOV being normally non-conducting but becoming conducting when the voltage across the MOV exceeds a predetermined level; and (b) at least one gas discharge tube connected between the AC neutral and the ground, the gas discharge tube being normally non-conducting but becoming conducting when the voltage across the gas discharge tube exceeds a predetermined level, the gas discharge tube substantially eliminating leakage current through the MOV.

2. The apparatus of claim 1 further comprising at least one temperture sensing fuse connected in series with the AC power line and located in physical proximity to the MOV and/or the gas discharge tube, the temperature sensing fuse being normally conducting, but becoming non-conducting when the temperature of the MOV and/or the gas discharge tube exceeds a predetermined level.

3. The apparatus of claim 1 further comprising:

(a) an AC power plug adapted to be plugged into an AC outlet, the AC power plug having a first conductor for connection to the AC power line, a second conductor for connection to the AC neutral and a third conductor for connection to the ground; and (b) a plurality of female outlets, each outlet having first, second and third conductors connected, respectively, to the first, second and third conductors of the AC power plug.

4. The apparatus of claim 2 further comprising:

(a) an AC power plug adapted to be plugged into an AC outlet, the AC power plug having a first conductor for connection to the AC power line, a second conductor for connection to the AC neutral and a third conductor for connection to the ground; and (b) a plurality of female outlets, each outlet having first, second and third conductors connected, respectively, to the first, second and third conductors of the AC power plug.

5. The apparatus of claim 3 or 4 further comprising an overvoltage and overcurrent protection circuit adapted to be connected in series with a telephone voice line and to the ground for protecting the telephone voice line from overvoltage and overcurrent conditions appearing thereon.

6. The apparatus of claim 5 further comprising second and third overvoltage and overcurrent protection circuits adapted to be connected in series with a high speed data line and to the ground for protecting the high speed data line from overvoltage and overcurrent conditions appearing thereon.

7. The apparatus of any of claims 1, 2, 3 or 4 further comprising a coaxial surge arrestor adapted to be connected in series with a coaxial transmission line and to the ground for protecting the coaxial transmission line from overvoltage conditions appearing thereon.

8. The apparatus of claim 3 or claim 4 further comprising:

(a) an overvoltage and overcurrent protection circuit adapted to be connected in series with a telephone voice line and to the ground for protecting the telephone voice line from overvoltage and overcurrent conditions appearing thereon; and (b) a coaxial surge arrestor adapted to be connected in series with a coaxial transmission line and to the ground for protecting the coaxial transmission line from overvoltage conditions appearing thereon.

9. The apparatus of claim 7 wherein the coaxial surge arrestor comprises:

(a) a hollow conductive housing;

(b) insulating ends adapted to seal the housing;

(c) an inert gas sealed in the housing;

(d) a conductor extending through the housing, the conductor having a longitudinal axis oriented in a direction parallel to the direction of signal transmission; and (e) the diameter of the conductor being varied along at least a portion of the length of the conductor within the housing for matching the impedance of the surge arrestor to that of the coaxial transmission line.

10. The apparatus of any of claims 1, 2, 3 or 4 wherein the gas discharge tube is a two electrode gas discharge tube.

11. The apparatus of any of claims 1, 2, 3 or 4 wherein the gas discharge tube is a three electrode gas discharge tube.

12. The apparatus of claim 2 or claim 4 wherein the gas discharge tube is a two electrode gas discharge tube and further comprising a second temperature sensing fuse connected in series with the gas discharge tube between the AC neutral and the ground.

13. The apparatus of any of claims 1, 2, 3 or 4 wherein the gas discharge tube is a three electrode gas discharge tube and further comprising a second MOV connected between the AC power line and the gas discharge tube and a third MOV connected between the AC neutral and the gas discharge tube.

14. The apparatus of claim 13 further comprising a temperature sensing fuse connected in series with the AC neutral and the third MOV.

* * * * *